United States Patent [19]

Heberling

[11] 3,755,750

[45] Aug. 28, 1973

[54] NOISE SUPPRESSION FILTER

[75] Inventor: Emory D. Heberling, Riverside, Calif.

[73] Assignee: The United States of America as represented by the Secretary of the Navy, Washington, D.C.

[22] Filed: Mar. 30, 1972

[21] Appl. No.: 239,544

[52] U.S. Cl. .................. 328/167, 307/229, 307/235, 307/237, 328/150, 328/171

[51] Int. Cl. .............................................. H03k 1/10

[58] Field of Search .................... 328/167, 171, 150; 307/229, 237, 235

[56] References Cited

UNITED STATES PATENTS

| | | | |
|---|---|---|---|
| 2,497,693 | 2/1950 | Shea | 328/171 X |
| 2,890,335 | 6/1959 | Gibbon | 328/171 X |
| 2,956,153 | 10/1960 | Farlow | 328/167 X |
| 3,086,166 | 4/1963 | Salvatori | 307/229 X |
| 3,303,425 | 2/1967 | Pendleton | 328/167 X |
| 3,524,081 | 8/1970 | Campanella | 328/171 X |
| 3,548,323 | 12/1970 | Gordon et al. | 307/237 X |
| 3,390,341 | 6/1968 | Kline | 307/237 X |
| 3,633,091 | 1/1972 | Bowers | 307/235 X |
| 3,686,577 | 8/1972 | Fruhauf | 307/235 X |

*Primary Examiner*—John S. Heyman
*Attorney*—Richard S. Sciascia, Joseph M. St. Armand et al.

[57] ABSTRACT

A simple and inexpensive device for filtering undesirable high frequency noise from analog data outputs of a data processing system, which operates in two different modes and switches automatically from one to the other depending on the rate of change of data functions and on data transient amplitude with respect to full scale. If the input data is a dc level or a slowly varying dc function, the subject device operates as a low pass filter to attenuate noise in the output, and if a step or square wave function occurs in the data the filter is automatically removed until the transition is completed and then the device reverts back to the low pass filter mode of operation.

2 Claims, 4 Drawing Figures

NOISE SUPPRESSION FILTER

BACKGROUND OF THE INVENTION

The present invention relates to electronic noise filters and more particularly to a simple, inexpensive and automatic means for optimizing the transmission bandwidth of analog data with respect to amplitude and rate of change of the data.

Filtering to improve the signal-to-noise ratio is common practice in data processing systems. The primary application for this invention is to filter decommutated analog outputs prior to recording the data on galvanometer-type strip chart recorders. This invention is especially useful with UHF-PAM telemetry systems.

An important advantage of UHF-PAM telemetry is fast response to transients and square-wave data. The filter in this invention attenuates high frequency noise associated with wide-band response without loss of data bandwidth for transients and high frequency data. In the past, FM/FM ground stations provided the necessary filtering for each channel in banks of sub-carrier discriminators. One desirable feature of the PAM system is that the data bandwidth of the various outputs is not restricted to specific cut-off frequencies, therefore, it is undesirable to include fixed frequency filters in the PAM decommutator system.

Standard fixed or tunable decoupled filters are not satisfactory or suitable for optimizing the transmission bandwidth of analog data wijh respect to amplitude and rate of change of the data as does the present invention, because the standard filters operate continuously at one cut-off frequency whereas the present filter will switch cut-off frequencies automatically with change of data filtering requirements.

The best method of operation in the past has been to omit the standard filters and endure excessive noise on the traces of chart recordings because of the large number of filters required, typically, 30 or more per system. The cost, set-up time and operating inconvenience of properly tuning such a large number of filters which may require readjustments for each type of data processed has been prohibitive.

SUMMARY OF THE INVENTION

The present invention is for a circuit to optimize the transmission bandwidth of analog data with respect to the amplitude and rate of change of the data. The circuit consists of a pair of oppositely poled diodes connected across the input resistor of a low pass filter. The diodes conduct when a step or high frequency voltage occurs of amplitude greater than the diode conduction voltage. This establishes a low resistance path across the low pass filter and effectively shunts the filter. Thus, the system is switched from a low pass mode to a wideband mode. There are no known prior art devices which function to filter analog outputs of a data processing system prior to recording the data on a strip chart recorder to optimize the transmission bandwidth. The present device greatly improves the quality and appearance of strip chart recordings of PAM-UHF data. Advantages of this invention over standard low pass filters are: The filter of this invention is automatically adaptive to the frequency of the input data and provides a narrow bandwidth for slow varying data and a wide bandwidth for high frequency data; the present filter is suitable for both high and low frequency data without selector switches, tuning dials or controls of any type, and the device is very effective in removing high frequency noise from analog data without the attention of an operator; the simplicity, low cost, and small space required are ideal characteristics for applications where large quantities of noise suppression filters are needed (e.g., 10 filters could be mounted on one printed circuit card of 3 × 5 inches and three such cards with a power supply would be sufficient for a 30-channel decommutator and galvanometer system); the filter could be useful in many types of analog data filtering requirements.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
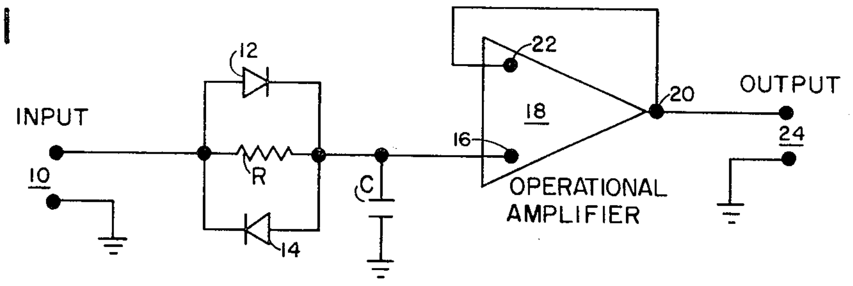
FIG. 1 is a circuit diagram of a preferred embodiment of the improved noise suppression filter of the present invention.

FIG. 1 shows the electrical details of the filter circuit of this invention. A signal source to be filtered is applied at input 10. The internal source impedance at input 10 must be sufficiently low to drive capacitor C without distorting the source data if capacitor C were connected directly across the signal source at input 10.

The first mode of filter operation consists of resistor R and capacitor C acting as a dc-coupled RC low pass filter with cut-off in the lower portion of the data range (for example, 50 Hz). The exact cut-off frequency is dependent on the selected values of R and C.

Figure 2:
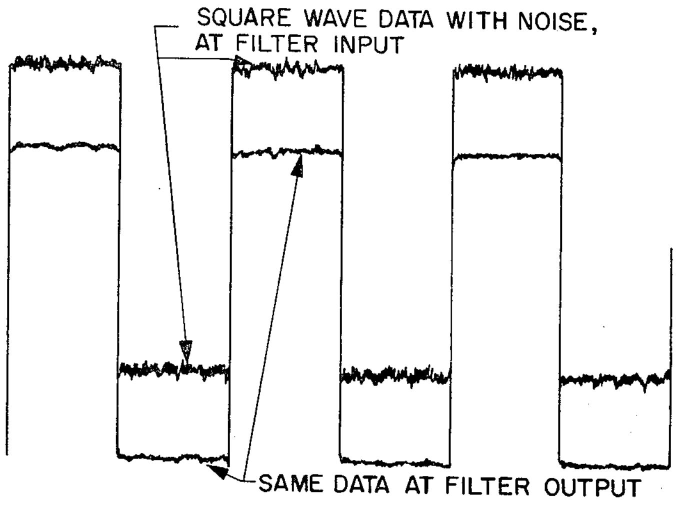
FIG. 2 shows square wave data with noise at the filter input as compared with the same square wave data at the filter output after filtering.
Figure 3:
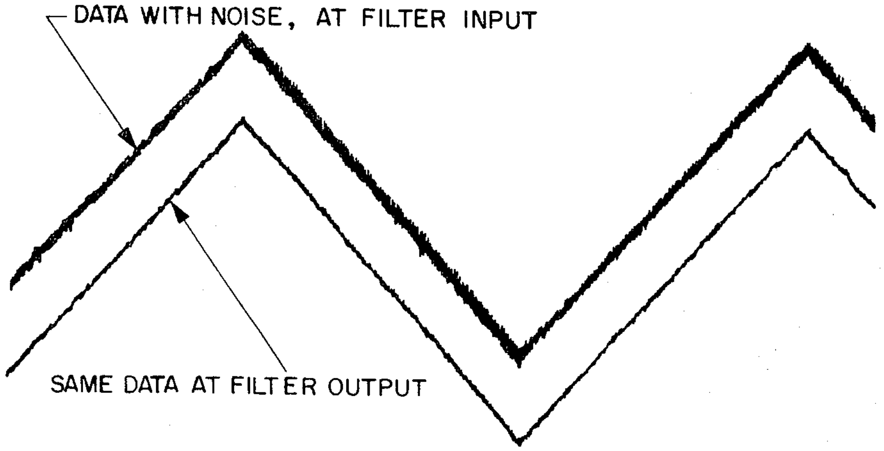
FIG. 3 shows a sawtooth waveform data at the filter input and at the output after filtering.
Figure 4:
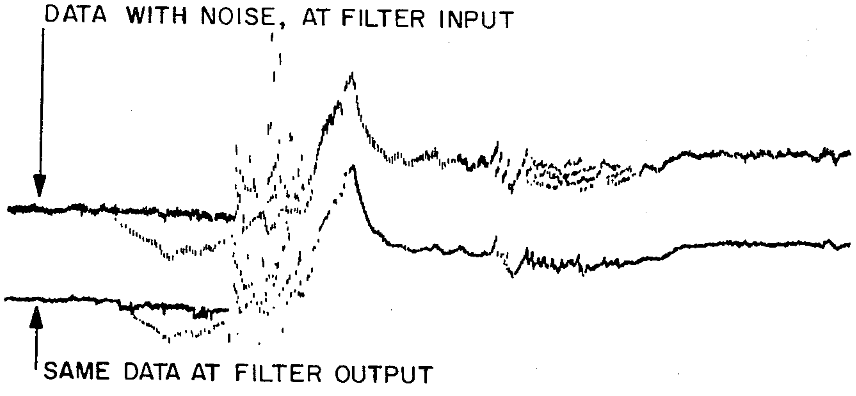
FIG. 4 shows another data waveform with noise and also after filtering.

For analysis, assume that the diodes 12 and 14 are disconnected from the circuit. The RC network then presents a filtered form of the source signal to input 16 to the non-inverting operational amplifier 18. The connection from the operational amplifier output 20 to inverting input 22 to the amplifier provides unity gain from input 16 to output 20. The operation of the filter in the first mode of operation is therefore a simple RC filter which rejects noise components superimposed on low frequency data by 6 db/octave above the filter cut-off. Noise components in the range from 1 to 5 kHz would be significantly attenuated. The filter operates under these conditions for steady state or dc data at any level in the modulation range or for slowly varying functions. Examples of noise filtered data are shown in FIGS. 2, 3 and 4.

Adding diodes 12 and 14 as shown in FIG. 1 provides another mode of operation for step or high frequency data. Assuming that the full scale data range of the source at input 10 is 10 volts peak (or +5 volts centered about ground) and diodes 12 and 14 have a conducting potential of 0.5 V, then a step change of input data level greater than +0.5 V or +5 percent of full scale will cause one of the diodes to conduct which in turn charges capacitor C to the data source amplitude. For Step or high frequency data, the low pass filter is thereby shunted and the filter output 24 will be identical to the input signal at 10 in rise time and amplitude less the 5 percent amplitude change required to cause diode conduction. When a dc or steady state data level occurs, noise pulse components above the RC cut-off frequency are attenuated for noise amplitudes up to +5 percent of full scale data. For greater noise amplitudes, the noise level at output 24 will be reduced by +5 percent of full scale.

A summary of operating characteristics of the invention are as follows: the circuit provides a low pass filter for steady state and slowly varying data (example, dc to 50 Hz), with significant attenuation of noise components in the 1 to 5 kHz range; the filter automatically switches to wide-band mode (dc to 8 kHz) for step or high frequency input data which exceeds +5 percent of full scale data, starting at any reference level within the data range; the filter remains in wide-band mode only for the duration of transients or fast rate-of-change input data which will cause diode conduction in either polarity, and then the filter reverts to low pass mode immediately following a step transition; no adjustments, trimmers or controls are required in the operation or use of the filter; and, the simplicity of this device, in which a low cost IC type of operational amplifier may be used, offers an economical approach in both cost and space for large quantities of analog data filters.

The filter of this invention can be included as an integral part of other equipment; for example, sample-and-hold output gates or digital to analog converters. The noise suppression feature of the invention would be applicable to data in analog form from any signal source including PCM and FM/FM telemetry systems.

Another application of this noise suppression filter is in the signal conditioning portion of a PAM decommutator. This filter with appropriate component values can replace the linear integrator normally used to suppress noise before decommutation.

What is claimed is:

1. A noise suppression filter system which operates in two different modes for optimizing the transmission bandwidth of analog data, switching from one mode to the other, depending upon the rate of change of data functions and on data transient amplitude with respect to full-scale amplitude, comprising:

a. circuit input and output terminals;

b. a resistance-capacitance low pass filter network means;

c. an operational amplifier, the output of which is connected to its inverting input and to said circuit output terminal;

d. said resistance-capacitance filter network means being connected between said circuit input terminal and the non-inverting input to said operational amplifier, said resistance-capacitance low-pass filter network means having a cut-off in the lower portion of the data range.

e. a pair of oppositely poled diodes connected across the input resistor of said resistance-capacitance filter means;

f. said diodes conducting when either of step and high frequency voltage signals of amplitude greater than the conduction voltage of said diodes occur at said circuit input terminal, establishing a low resistance path across said low-pass filter network and effectively shunting said low-pass filter network to switch the filter system from a low-pass mode to a wideband mode;

g. said filter system operating for steady state and dc data at any level in the modulation range as well as for slowly varying functions;

h. said filter system automatically switching to wideband mode for step and high frequency input data which exceeds ±5 percent of full-scale data, and remaining in wideband mode only for either of the duration of transients and fast rate-of-change input data which causes diode conduction in either polarity and then reverting to low-pass model immediately following a step transition.

2. A filter system as in claim 1 wherein said low-pass filter network rejects noise components superimposed on low frequency data by approximately 6 db/octave above the low-pass filter cut-off with noise components in the range of from 1 to 5 $kH_z$ being significantly attenuated.

* * * * *